(12) United States Patent
Ueno

(10) Patent No.: US 6,751,194 B1
(45) Date of Patent: Jun. 15, 2004

(54) PACKET MULTIPLEXER FOR PRIORITY CONTROL

(75) Inventor: Hiroshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 740 days.

(21) Appl. No.: 09/583,737

(22) Filed: May 31, 2000

(30) Foreign Application Priority Data

May 31, 1999 (JP) .............................. 11-153052

(51) Int. Cl.$^7$ ................................. H04J 3/14
(52) U.S. Cl. ......................... 370/235; 370/412
(58) Field of Search ................ 370/235, 230.1, 370/412, 413, 414, 416, 417, 418, 468, 395.4, 395.41, 395.42, 395.43

(56) References Cited

U.S. PATENT DOCUMENTS

| | | | |
|---|---|---|---|
| 4,942,569 A | * 7/1990 | Maeno ...................... | 370/230 |
| 4,979,165 A | * 12/1990 | Dighe et al. ............... | 370/416 |
| 5,231,633 A | * 7/1993 | Hluchyj et al. ............ | 370/429 |
| 5,859,835 A | * 1/1999 | Varma et al. .............. | 370/229 |
| 5,953,341 A | * 9/1999 | Yamanaka et al. ......... | 370/416 |
| 6,236,656 B1 | * 5/2001 | Westerberg et al. ..... | 370/395.4 |
| 6,262,986 B1 | * 7/2001 | Oba et al. ................. | 370/399 |
| 6,466,580 B1 | * 10/2002 | Leung ....................... | 370/412 |
| 6,570,876 B1 | * 5/2003 | Aimoto ..................... | 370/389 |

FOREIGN PATENT DOCUMENTS

| | | | |
|---|---|---|---|
| EP | 526104 A2 | * 2/1993 | ........... H04L/12/56 |
| EP | 660569 A1 | * 6/1995 | ........... H04L/12/56 |
| JP | 7-79253 | 3/1995 | |

OTHER PUBLICATIONS

Jing–Fei, Ren et al., "A Dynamic Priority Queueing Approach to Traffic Regulation and Scheduling in B–ISDN". GLOBECOM '94 IEEE Global Telecommunications Conference, 1994. Nov. 28–Dec. 2, 1994. San Francisco, CA. vol. 1. pp. 612–618.*

Byung Kook, Kim. et al. "Scalable Hardware Earliest–Deadline–First Scheduler for ATM Switching Networks". Real–Time Systems Symposium, 1997. The 18th IEEE Proceedings. Dec. 2–5, 1997. pp. 210–218.*

* cited by examiner

*Primary Examiner*—Chau Nguyen
*Assistant Examiner*—Donald L Mills
(74) *Attorney, Agent, or Firm*—Foley & Lardner LLP (57) ABSTRACT

An input processing unit, calculates on receiving input packets their output time limit values based on the delay time limit values, and stores the results in the attribute storing memory, together with the packet sizes. A read controlling unit compares the first several entries in a queue as to the output time limit values and packet sizes that are stored in an attribute storing memory, and outputs the packets in decreasing order of size within the range in which the delay time limit values will be met.

29 Claims, 4 Drawing Sheets

PACKET MULTIPLEXER FOR PRIORITY CONTROL

BACKGROUNDS OF THE INVENTION

1. Field of the Invention

The present invention relates to a packet multiplexer or a packet switch that accommodates TCP/IP traffic in particular, and to improvement by enabling the coexistence of transfer of best effort services and transfer of traffic services that require delay quality.

2. Description of the Related Art

Conventionally, a transfer device, which represents the first tier in introducing a packet line from a subscriber into the trunk network, has been implemented as a multiplexer. Conventional packet multiplexers are mainly used as leased circuits, with which some means of quality assurance, including congestion control and error control, are provided. One well-known example of congestion control for conventional packet switching networks is the technique disclosed in Japanese Patent Laying-Open (Kokai) No. Heisei 7-79253.

This technique measures transmission delay based on a packet requesting measurement of transmission delay, which is sent from a source, and the corresponding packet acknowledging measurement of transmission delay, which is sent from the switch back to the source, and attempts to reduce network congestion by giving higher priority in processing to packets with greater delays and by causing sources with smaller delays to reduce the number of packets that they send.

Meanwhile, as the construction of TCP/IP-based networks has been actively promoted in recent years, demand has arisen for the integration of sound/image transfer services that require delay quality, in addition to conventional best effort TCP/IP traffic. In order to meet such demand, such techniques as weighed round robin and weighed fair queuing for controlling reading from a queue having multiple priorities have been proposed and/or realized. These control techniques determine the next packet to read, based on the number of packets already read from the queue.

Conventional packet multiplexers, however, do not provide guarantee that packet delay will be limited within a desired range; this very often has led to the problem that some packets may suffer from significant delay in arrival, resulting in failure to transfer realtime information with sufficient quality, which is essential to sound/image transfer services. In the case of the technique disclosed in the above-mentioned official gazette as well, packet switches do not guarantee different delays for different flows; this has led to the problem that packets do not arrive in sequence when transmitted sound and/or images are being reconstructed, giving rise to complaints among users about quality.

SUMMARY OF THE INVENTION

An objective of the present invention is to resolve the problems described above by providing a packet multiplexer that enables the coexistence of transfer of best effort services and transfer of traffic services that require delay quality.

Another objective of the present invention is to provide a packet multiplexer that enables delay time guarantee, which has not been achieved in conventional priority control methods that allocate packets to queues with different priorities simply based on the lengths of packets.

Yet another objective of the present invention is to provide a packet multiplexer that enables to discard illegal packets incoming from the subscriber or lower the read priority of such packets, thereby enabling efficient use of transmission bandwidths within the network.

According to one aspect of the invention, a packet multiplexer, comprises an input processing means for setting an output time limit value in the input packet and for measuring the sizes of packets in question and converting the measurements to values in terms of processing times corresponding to these sizes, a first storing means for storing the packets, a second storing means for storing the order in which these packets are to be output according to the order in which they are received, an attribute storing means for storing the output time limit value and sizes of the packets that are calculated by the input processing means, and a read controlling means for comparing the first entry and the following entry as to the output time limit values and sizes that are stored in the second attribute storing means and then selecting a packet to output so that the packets will be output in decreasing order of size within the range in which the output time limit values will meet the delay time limit values.

In the preferred construction, the input processing means further comprises an attribute table for storing the delay time limit values, a time stamp generating means for calculating an output time limit value based on the delay time limit value and the time required for the packet to arrive, and a size measuring means for measuring the size of the packet and converting the result into a value in terms of processing time corresponding to this size.

In another preferred construction, the read controlling means selects a packet signal by giving priority to those packets that will time out.

In another preferred construction, the input processing means further comprises an attribute table for storing the delay time limit values, a time stamp generating means for calculating an output time limit value based on the delay time limit value and the time required for the packet to arrive, and a size measuring means for measuring the size of the packet and converting the result into a value in terms of processing time corresponding to this size, wherein the read controlling means selects a packet signal by giving priority to those packets that will time out.

In another preferred construction, the input processing means has an integration table for adding up the packet sizes, wherein the read controlling means discards the contents stored in the first storing means, second storing means, and attribute storing means if the integrated value in the integration table exceeds the threshold.

In another preferred construction, the input processing means further comprises an attribute table for storing the delay time limit values, a time stamp generating means for calculating an output time limit value based on the delay time limit value and the time required for the packet to arrive, a size measuring means for measuring the size of the packet and converting the result into a value in terms of processing time corresponding to this size, an integration table for adding up the packet sizes, wherein the read controlling means discards the contents stored in the first storing means, second storing means, and attribute storing means if the integrated value in the integration table exceeds the threshold.

In another preferred construction, the input processing means has an integration table for adding up the packet sizes, wherein the read controlling means selects a packet signal by giving priority to those packets that will time out, and discards the contents stored in the first storing means, second storing means, and attribute storing means if the integrated value in the integration table exceeds the threshold.

In another preferred construction, the input processing means further comprises an attribute table for storing the delay time limit values, a time stamp generating means for calculating an output time limit value based on the delay time limit value and the time required for the packet to arrive, a size measuring means for measuring the size of the packet and converting the result into a value in terms of processing time corresponding to this size, and an integration table for adding up the packet sizes, wherein the read controlling means selects a packet signal by giving priority to those packets that will time out, and discards the contents stored in the first storing means, second storing means, and attribute storing means if the integrated value in the integration table exceeds the threshold.

In another preferred construction, the input processing means has an integration table for adding up the packet sizes, wherein the read controlling means sets the output time limit value for the packet that is stored in the attribute storing means to the maximum if the integrated value in the integration table exceeds the threshold.

In another preferred construction, the input processing means further comprises an attribute table for storing the delay time limit values, a time stamp generating means for calculating an output time limit value based on the delay time limit value and the time required for the packet to arrive, a size measuring means for measuring the size of the packet and converting the result into a value in terms of processing time corresponding to this size, and an integration table for adding up the packet sizes, wherein the read controlling means sets the output time limit value for the packet that is stored in the attribute storing means to the maximum if the integrated value in the integration table exceeds the threshold.

In another preferred construction, the input processing means has an integration table for adding up the packet sizes, wherein the read controlling means selects a packet signal by giving priority to those packets that will time out, and sets the output time limit value for the packet that is stored in the attribute storing means to the maximum if the integrated value in the integration table exceeds the threshold.

In another preferred construction, the input processing means further comprises an attribute table for storing the delay time limit values, a time stamp generating means for calculating an output time limit value based on the delay time limit value and the time required for the packet to arrive, a size measuring means for measuring the size of the packet and converting the result into a value in terms of processing time corresponding to this size, and an integration table for adding up the packet sizes, wherein the read controlling means selects a packet signal by giving priority to those packets that will time out, and sets the output time limit value for the packet that is stored in the attribute storing means to the maximum if the integrated value in the integration table exceeds the threshold.

In another preferred construction, the first storing means consists of a high-priority queue for storing the output order in which the delay-guaranteed packet that should be output earlier is to be output, and a low-priority queue for storing the output order in which the non-delay-guaranteed packet is to be output, wherein the read controlling means whenever the packets exist in the high-priority queue, gives output priority to such packets.

In another preferred construction, the first storing means consists of a high-priority queue for storing the output order in which the delay-guaranteed packet that should be output earlier is to be output, and a low-priority queue for storing the output order in which the non-delay-guaranteed packet is to be output, wherein the read controlling means selects from the packets stored in the high-priority queue by giving priority to packet signals that will time out, and selects from the packets stores in the low-priority queue in sequence from the first packet.

According to another aspect of the invention, a packet multiplexer, comprises an input processing unit which sets an output time limit value in the input packet and measures the sizes of packets in question and converts the measurements to values in terms of processing times corresponding to these sizes, a storing memory which stores the packets, a queue which stores the order in which these packets are to be output according to the order in which they are received, an attribute storing memory which stores the output time limit value and sizes of the packets that are calculated by the input processing unit, and a read controlling unit which compares the first entry and the following entry as to the output time limit values and sizes that are stored in the second attribute storing memory and then selects a packet to output so that the packets will be output in decreasing order of size within the range in which the output time limit values will meet the delay time limit values.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
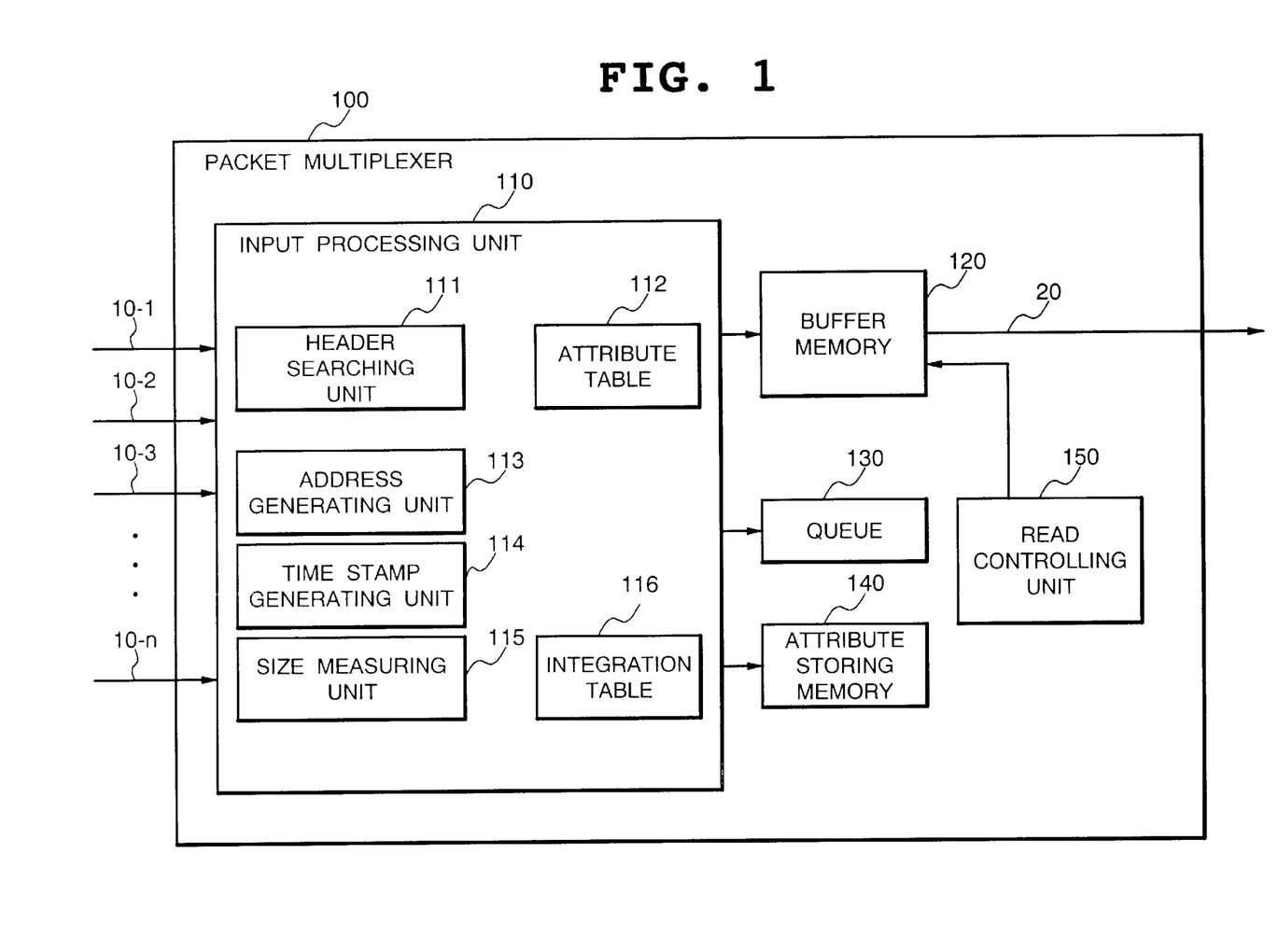
FIG. 1 is a configuration block diagram for explaining a packet multiplexer according to the first embodiment of the present invention.

FIG. 1 is a configuration block diagram for explaining a packet multiplexer according to the first embodiment of the present invention, and shows the configuration of a packet multiplexer 100.

The packet multiplexer 100 of this embodiment is configured so that it comprises an input processing unit 110 for setting an output time limit value in the input packets and for measuring the sizes of packets in question and converting the measurements to values in terms of processing times corresponding to these sizes; a buffer memory 120 for storing the packets; a queue 130 for storing the order in which the packets are to be output according to the order in which they are received; an attribute storing memory 140 for storing the output time limit value and sizes of the packets in question that are calculated by the input processing unit; and a read controlling unit 150 for comparing the first entry and the following entry stored in the attribute storing memory as to the output time limit it value and size and then selecting the packet to output so that the packets will be output in decreasing order of size within the range in which the output time limit value will meet the delay time limit value.

Through such configuration as described above, the packet multiplexer 100 can guarantee delay time within the device by performing read priority control. On receiving input packets, the input processing unit 110 calculates their output time limit values based on the delay time limit values, and stores the results in the attribute storing memory 140, together with the packet sizes. The delay time limit values will be met, since the read controlling unit 150 compares the first several entries in the queue 130 as to the output time limit values and sizes that are stored in the attribute storing memory 140, and outputs the packets in decreasing order of size within the range in which the delay time limit values will be met.

A configuration is also possible in which the input processing unit 110 has an integration table 116 for adding up packet sizes, and a read controlling unit 150 discards the contents for the packet in question that are stored in the buffer memory 120, the queue 130, and the attribute storing memory 140 if the integrated value from the integration table 116 exceeds the threshold. Discarding bulky packets that exceed the threshold ensures proper processing of other packets, thereby increasing the likeliness that the delay time limit values will be met.

Yet another configuration is possible in which the read controlling unit 150 sets the output time limit value stored in the attribute storing memory 140 for the packet in question to the maximum if the integrated value from the integration table 116 exceeds the threshold. Lowering the priority for bulky packets that exceed the threshold ensures proper processing of other packets, thereby increasing the likeliness that the delay time limit values will be met; if space becomes available, these packets will be processed and transmitted although the delay time limit values will not be met.

Next, an embodiment of the present invention will be described in detail with reference to an example.

With reference to FIG. 1, the input processing unit 110 performs input processing on packets from the respective input lines 10-1 to 10-n, and consists of a header searching unit 111, an attribute table 112, an address generating unit 113, a time stamp generating unit 114, a size measuring unit 115, and an integration table 116.

The header searching unit 111 searches attributes using the destination and source addresses contained in the packet header, and acquires information concerning flows in question from the attribute table 112. The attribute table 112 contains a flag indicating whether delay guarantee will be conducted or not, a delay time limit value, a flag indicating whether policing will be conducted or not, and a threshold used for policing, all of which are pre-set using the control system within the device (not shown). The operation of policing will be described later.

The address generation unit 113 generates the address of the buffer memory 120 in which a packet will be written temporarily, the address of the attribute storing memory 140 in which packet attributes will be stored, and the address of the queue 130 in which the addresses of the attribute storing memories 140 will be written in the order of packets received. The time stamp generating unit 114 fetches the delay request value within the device from the packet attribute read from the header searching unit 111, and calculates the output time limit based on this value and the reception time. The size measuring unit 115 measures the sizes of packets. The integration table 116 adds up the packet size per flow ID in units of a fixed widow size (fixed time), which is provided for easier management of integrated values.

An input packet is written in the buffer memory 120 located at the address generated by the input processing unit 110. The output time limit value, size, and the address of the buffer memory 120 are written in the attribute storing memory 140, whose address in turn will be written in the queue 130.

The read controlling unit 150 examines the queue 130 from the start, fetches the address of the attribute storing memory 140 that is shown by the entries in the queue 130, and determines the next entry to read based on the size and output time limit value. The read controlling unit 150 then reads a packet using the address of the buffer memory 120 corresponding to the entry chosen for the next read, and outputs the packet to the output line 20.

Figure 2:
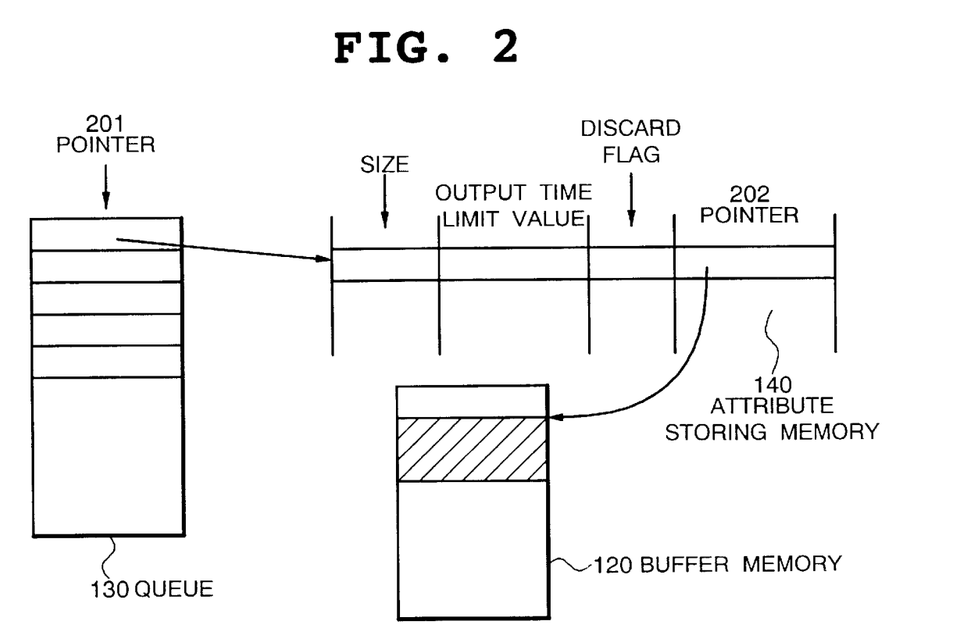
FIG. 2 is a configuration block diagram showing the relationship among the buffer memory, queue, and attribute storing memory.

FIG. 2 is a block diagram showing the relationship among the buffer memory 120, queue 130, and attribute storing memory 140. In the queue 130, a pointer 201 is written, which represents the address of the attribute storing memory 140, and in the attribute storing memory 140, a pointer 202 is written, which represents the address of the buffer memory 120 in which the size, output time limit value, discard flag, and the applicable packet are written. In the buffer memory 120 indicated by the pointer 202, packet data is written.

The operation of a device configured as described above will now be described. The input processing unit 110 of the packet multiplexer 100 shown in FIG. 1 fetches the addresses of the destination and the source from the header of an input packet signal. In the case of an IP packet, for example, this operation means fetching the destination IP address and the source IP address. Following this operation, the header searching unit 111 searches the attribute table 112 using these values as search keys.

The delay time limit value, which is to be pre-specified by the controlling unit within the device, must be a value standardized based on the process basic cycle within the device. If the applicable packet is found by the header search to be a flow requiring delay guarantee, the time stamp generating unit 114 calculates the output time limit value by adding the delay time limit value to the packet arrival time. The size measuring unit 115 measures the size of the packet received, and converts the resulting size to the value in terms of processing time. For example, assuming that the time required for processing a packet whose size is 64 bytes is the basic unit, this size will be referred to as size 1. A packet of 256 bytes will be size 4 after conversion. The said output time limit value is also represented using this unit; if the delay time limit value is the length of time equivalent to a transmission time of 6,400 bytes, then the delay time limit value is represented and set as 100. The address generating unit 113 manages the information concerning the queue 130, the buffer memory 120, and the available space in the attribute storing memory 140, and generates the respective addresses required for writing.

The input processing unit 110 thus allocates a time stamp attribute to each input packet, and writes it in the queue 130 in sequence. In actual operation, multiplexing is achieved by performing the same process on the input lines 10-1, 10-2 ... 10-n and writing the entries to be output to one queue 130 in sequence.

Figure 3:
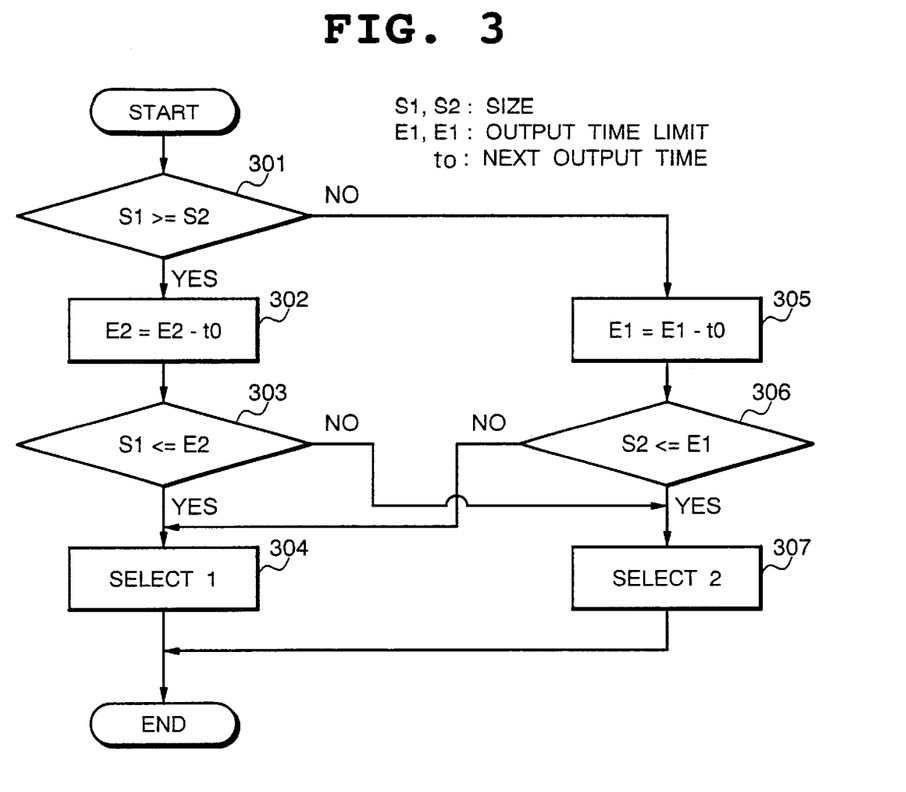
FIG. 3 is a flowchart for explaining the operation of the read controlling unit for comparing packets in size and output time limit value.

The read operation will now be described. FIG. 3 is a flowchart for explaining the operation of the read controlling unit 150 for comparing packets in size and output time limit value. The read controlling unit 150 examines a queue 130 from the start to determine the next packet to read. The read controlling unit 150 first reads the attributes of the two entries from the start of the queue 130 by referring to each address pointed by the pointer 201, and compares these two entries based on size and output time limit value. In FIG. 3, the sizes of the two entries are indicated as S1 and S2, and their output time limit values as E1 and E2, respectively. The time for the next packet to be read is assumed as t0.

In Step 301, the two sizes, S1 and S2, are compared. If the size S1 is greater than the size S2, E2–t0 is made a new output time limit value at Step 302. By this, the remaining time from the next output time to the output time limit is obtained. Next, at Step 303, the size S1 and the output time limit value E2 are compared. If the size S1 is smaller, Packet 1 will be selected because it means that the output time limit value E2 will not time out when Packet 1 is output. If the size S1 is greater than the output time limit value E2, Packet 2 will be selected because it means that Packet 2 will be expired when the size S1 is output (Step 307).

On the other hand, if the size S2 is found to be greater than the size S1 through comparison at Step 301, E1–t0 is made a new output time limit value E1 at Step 305. Similarly to Step 303, Step 306 compares the size S2 and the output time limit value E1, and if the size S2 is smaller, Packet 2 will be selected because it means that the output time limit value E1 will not time out even if Packet 2 is output (Step 307). If the size S2 is greater than the output time limit value E1, Packet 1 will be selected because it means that Packet 1 will time out if the size S2 is output (Step 304) As stated above, two entries are compared and one of them is selected.

This comparison process is performed by a microprocessor or a hardware logical circuit; in the actual process, entries in a queue 130 are examined and compared multiple times in sequence from the start. In other words, one entry is selected from the first two in the queue 130, and then the third entry and this entry selected previously are compared in a similar manner. By repeating such comparison several times, the next packet to output is selected and determined. The following example performs comparison three times for four entries, while the number of times of comparison is made changeable because it is limited by the time required for one comparison and the time to the next output.

Figure 4:
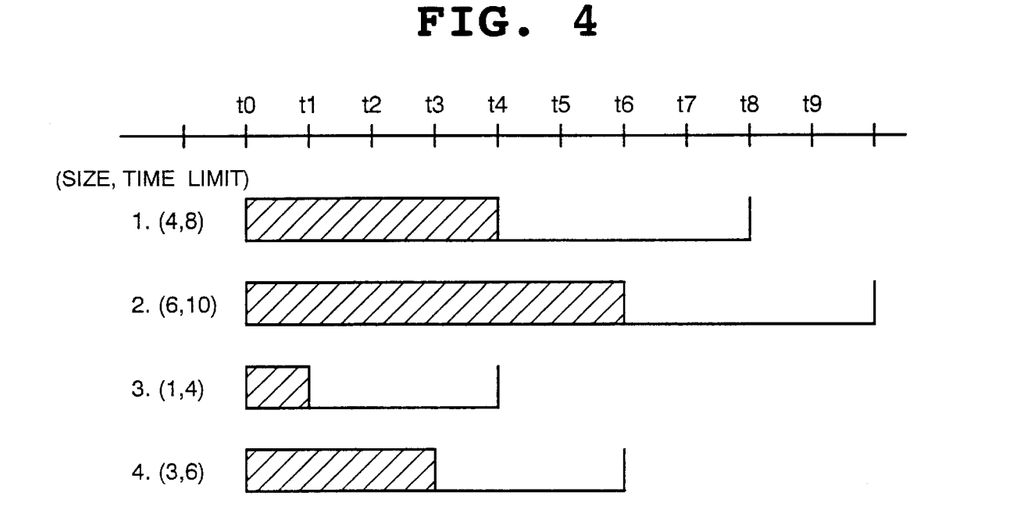
FIG. 4 is a diagram for explaining an example of the process flow shown in FIG. 3.

FIG. 4 is a diagram for explaining an example of the process flow shown in FIG. 3. In FIG. 4, the first entry in the queue 130 is a packet with attributes of size 4 and output time limit 8 and the second entry is a packet with attributes of size 6 and output time limit 10. Using the codes in FIG. 3, these can be represented as S1=4, S2=6, E1–t0=8, and E2–t0=10. In this example, the time limit period is set so that time t0 will be 0.

Since the selection process gives S2>S1, the device proceeds to comparison at Step 305. It then selects Packet 2 at Step 307 since S2<E1. Packet 2 is further compared with the third entry. Assuming S3=1 and E3–t0=4, S2>S3 and thus the size S2 and the output time limit value E3 are compared. This gives S2>E3, and therefore Packet 3 is selected. Packet 3 is then compared with the fourth entry. Assuming S4=3 and E4–t0=6, S4>S3 and thus the size S4 and the output time limit value E3 are compared. This gives S4>E3, and therefore Packet 4 is selected. In this example, comparing the first to fourth packets in the queue 130 results in selection of Packet 4 for output.

After outputting Packet 4, the output timing for the next packet becomes the time t3. Using this time as the reference time limit period, the selection process is conducted on Packet 1, Packet 2, and Packet 3, which have not been selected, and the fifth packet, if such entry exists. When the packet for output is determined in this manner, the read controlling unit reads the packet using the pointer 202 to the buffer memory 120 and outputs it to the outside.

The foregoing is the basic process for reading. A special case will now be described. If a flow is determined that it will not be delay-guaranteed by a header search, its output time limit is set to the maximum. This causes its priority during the selection process to be lowered.

The operation at the time of convergence will now be described. At the time of congestion, it is expected that packets that exceed the output time limit may occur. In addition to specifying whether time guarantee will be conducted or not during an attribute search at the time of input, the operation to be conducted when the output time limit is exceeded is also specified. More specifically, specification is made as to whether a packet should be discarded or not if its output time limit expires. By this, it becomes possible to discard a packet if the process to select the next packet to output results in a negative value for E−t0, which means a time-out.

The operation of policing will now be described. A flag indicating whether policing will be conducted or not is set as one of the values to be acquired during a header search at the time of input, in addition to a threshold of transmission bandwidth permitted to a flow subjected to policing. A flow ID is also defined for easier management of integrated values, and is used as an address when accessing the integration table 116. This flow ID is also set in the attribute table 112. By holding the integrated value for each ID in this table, and adding up packet sizes in units of a fixed window size (fixed time), it is judged whether a violation exists against this integrated value or not. An integrated value is cleared every time the window size is reached.

The results of size measurement at packet reception are added up and a state of violation is declared when the pre-determined threshold is exceeded. A violating packet is handled according to the setting, whether it should be discarded or its priority for read from a queue should be lowered by maximizing the output time limit, as stated above.

Figure 5:
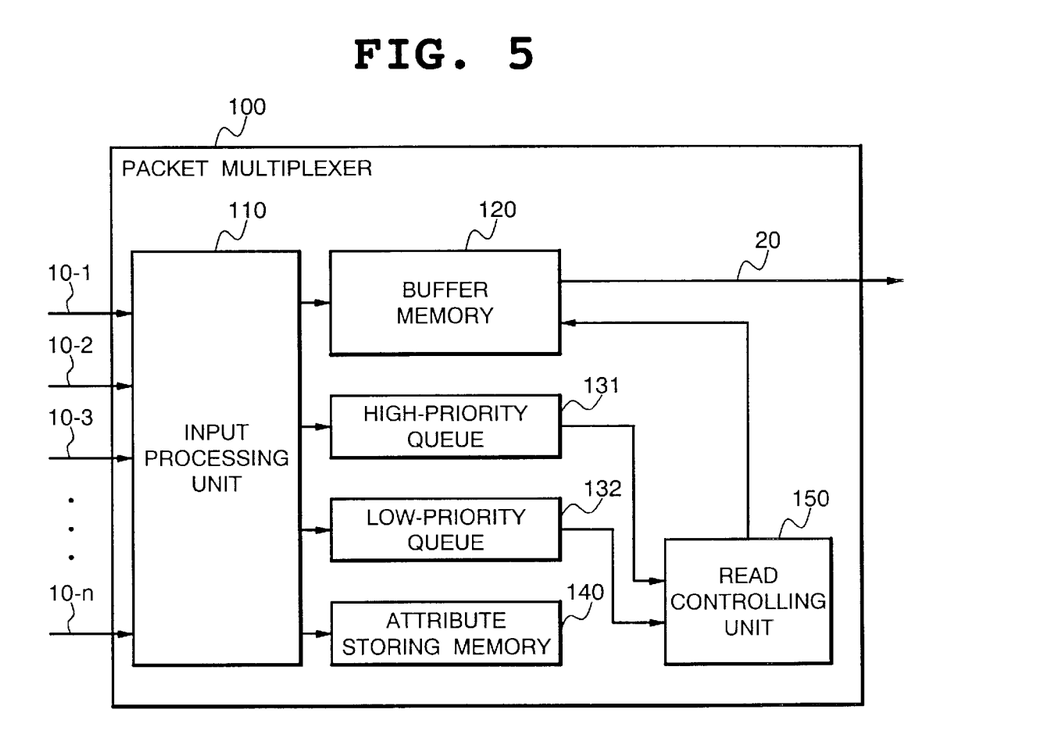
FIG. 5 is a configuration block diagram for explaining a packet multiplexer according to the second embodiment of the present invention.

FIG. 5 is a configuration block diagram for explaining a packet multiplexer according to the second embodiment of the present invention. A comparison with the embodiment shown in FIG. 1 shows that the second embodiment has two queues with different priorities, while the configuration of the first embodiment was explained for output control for the single queue 130. The two queues consist of a high-priority queue 131 with a higher read priority, and a lower-priority queue 132 with a lower read priority. The input processing unit 110 is the same as the one shown in FIG. 1.

In a multiplexer of this configuration, an input packet is written to the high-priority queue 131 if the attribute acquired by a header search indicates delay guarantee, or to the low-priority queue 132 if it does not indicate delay guarantee. The read controlling unit 150 reads from the high-priority queue 131 whenever it contains packets, and reads from the low-priority queue 132 when the high-priority queue 131 does not contain packets. The selection flow shown in FIG. 3 is used for a read from the high-priority queue 131 only; in a read from the low-priority queue 132, packets are read in sequence, beginning with the first one. By this, finer priority control becomes possible.

Although the embodiments described above deal with a single queue priority and two different queue priorities, respectively, the present invention is not limited to such configurations. In addition to these, configurations are also possible in which queues may be classified into three or more priority levels, and the queue with the highest priority is read most frequently, with other queues being read with decreasing frequencies according to the levels of priorities.

As described in the foregoing, the read controlling unit of the present invention makes it possible, when there are shorter and longer packets, to select to output longer packets whenever the requirement of delay time can be met, thereby first outputting longer packets with which effects of statistical multiplexing are not expected and later outputting shorter packets with which effects of statistical multiplexing are likely during less crowded hours. The present invention enables delay time guarantee, which has not been achieved in conventional priority control methods that allocate packets to queues with different priorities simply based on the lengths of packets.

Furthermore, by implementing configurations similar to that of the embodiment, in which the read controlling unit has the results of bandwidth policing for input packets reflected in the selection process, it becomes possible to discard illegal packets incoming from the subscriber side or lower the read priority of such packets, thereby ensuring more efficient use of transmission bandwidths within the network.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A packet multiplexer, comprising:
   an input processing means for setting an output time limit value in each of a first input packet and a second input packet and for measuring the sizes of said first and second input packets and converting the measurements to values in terms of processing times corresponding to these sizes, said output time limit values of each of said first and second input packets reflecting corresponding delay time limit values for each of said first and second input packets;
   a first storing means for storing the first and second input packets,
   a second storing means for storing the order in which the first and second input packets are to be output according to the order in which they are received;
   an attribute storing means for storing the output time limit values and sizes of the first and second input packets that are calculated by the input processing means; and
   a read controlling means for comparing the output time limit values and sizes that are stored in the attribute storing means for the first and second input packets and then selecting one of the first and second input packets to output so that the first and second input packets will be output in decreasing order of size within the range in which a scheduled output time of each of said first and second input packets will meet the corresponding delay time limit values.

2. The packet multiplexer as set forth in claim 1, wherein said input processing means further comprising
   an attribute table for storing said delay time limit values,
   a time stamp generating means for calculating said output time limit values based on said delay time limit values and a time required for each of said first and second input packets to arrive, and a size measuring means for measuring the size of said first and second input packets and converting the result into values in terms of processing time corresponding to said size.

3. The packet multiplexer as set forth in claim 1, wherein said read controlling means selects an input packet by giving priority to input packets that will time out.

4. The packet multiplexer as set forth in claim 1, wherein said input processing means further comprising
an attribute table for storing said delay time limit values,
a time stamp generating means for calculating said output time limit values based on said delay time limit values and a time required for each of said first and second input packets to arrive,
and a size measuring means for measuring the size of said first and second input packets and converting the result into values in terms of processing time corresponding to said size, wherein
said read controlling means selects an input packet by giving priority to input packets that will time out.

5. The packet multiplexer as set forth in claim 1, wherein said input processing means has an integration table for adding up said packet sizes to obtain an integrated value, wherein
said read controlling means discards the contents stored in said first storing means, second storing means, and attribute storing means if the integrated value in said integration table exceeds a predetermined threshold.

6. The packet multiplexer as set forth in claim 1, wherein said input processing means further comprising
an attribute table for storing said delay time limit values,
a time stamp generating means for calculating said output time limit values based on said delay time limit values and a time required for each of said first and second input packets to arrive,
a size measuring means for measuring the size of said first and second input packets and converting the result into values in terms of processing time corresponding to said size,
an integration table for adding up said packet sizes to obtain an integrated value, wherein
said read controlling means discards the contents stored in said first storing means, second storing means, and said attribute storing means if the integrated value in said integration table exceeds a predetermined threshold.

7. The packet multiplexer as set forth in claim 1, wherein said input processing means has an integration table for adding up said packet sizes to obtain an integrated value, wherein
said read controlling means selects an input packet by giving priority to input packets that will time out,
and discards the contents stored in said first storing means, second storing means, and attribute storing means if the integrated value in said integration table exceeds a predetermined threshold.

8. The packet multiplexer as set forth in claim 1, wherein said input processing means further comprising
an attribute table for storing said delay time limit values,
a time stamp generating means for calculating said output time limit values based on said delay time limit values and a time required for each of said first and second input packets to arrive,
a size measuring means for measuring the size of said first and second input packets and converting the result into values in terms of processing time corresponding to said size, and an integration table for adding up said packet sizes to obtain an integrated value, wherein
said read controlling means selects an unput packet by giving priority to input packets that will time out,
and discards the contents stored in said first storing means, second storing means, and attribute storing means if the integrated value in said integration table exceeds a predetermined threshold.

9. The packet multiplexer as set forth in claim 1, wherein said input processing means has an integration table for adding up said packet sizes to obtain an integrated value, wherein
said read controlling means sets the output time limit value for an input packet stored in said attribute storing means to a predetermined maximum value if the integrated value in the integration table exceeds a predetermined threshold.

10. The packet multiplexer as set forth in claim 1, wherein said input processing means further comprising
an attribute table for storing said delay time limit values,
a time stamp generating means for calculating said output time limit values based on said delay time limit values and a time required for each of said first and second input packets to arrive,
a size measuring means for measuring the size of said first and second input packets and converting the result into values in terms of processing time corresponding to said size,
and an integration table for adding up said packet sizes to obtain an integrated value, wherein
said read controlling means sets the output time limit value for an input packet stored in said attribute storing means to a predetermined maximum value if the integrated value in the integration table exceeds a predetermined threshold.

11. The packet multiplexer as set forth in claim 1, wherein said input processing means has an integration table for adding up said packet sizes to obtain an integrated value, wherein
said read controlling means selects an input packet by giving priority to input packets that will time out,
and sets the output time limit value for an input packet stored in said attribute storing means to a predetermined maximum value if the integrated value in the integration table exceeds a predetermined threshold.

12. The packet multiplexer as set forth in claim 1, wherein said input processing means further comprising
an attribute table for storing said delay time limit values,
a time stamp generating means for calculating said output time limit values based on said delay time limit values and a time required for each of said first and second input packets to arrive,
a size measuring means for measuring the size of said first and second input packets and converting the result into values in terms of processing time corresponding to said size,
and an integration table for adding up said packet sizes to obtain an integrated value, wherein
said read controlling means selects an input packet by giving priority to an input packet that will time out, and sets the output time limit value for an input packet in said attribute storing means to a predetermined maximum value if the integrated value in the integration table exceeds a predetermined threshold.

13. The packet multiplexer as set forth in claim 1, wherein said first storing means comprises:
a high-priority queue for storing the output order of delay-guaranteed packets to be output earlier,
and a low-priority queue for storing the output order of non-delay-guaranteed packets, wherein
said read controlling means whenever one or more input packets exist in said high-priority queue, gives output priority to said one or more input packets.

14. The packet multiplexer as set forth in claim 1, wherein said first storing means comprises:
a high-priority queue for storing the output order of delay-guaranteed packets to be output earlier,
and a low-priority queue for storing the output order of non-delay-guaranteed packets, wherein
said read controlling means selects from one or more packets stored in said high-priority queue by giving priority to input packets that will time out,
and selects from one or more input packets stored in said low-priority queue in sequence from the output order of non-delay-guaranteed packets.

15. A packet multiplexer, comprising:
an input processing unit which sets an output time limit value in each of a first input packet and a second input packet and measures the sizes of said first and second input packets and converts the measurements to values in terms of processing times corresponding to these sizes, said output time limit values of each of said first and second input packets reflecting corresponding delay time limit values for each of said first and second input packets;
a storing memory which stores the first and second input packets,
a queue which stores the order in which the first and second input packets are to be output according to the order in which they are received;
an attribute storing memory which stores the output time limit values and sizes of the first and second input packets that are calculated by the input processing unit;
and a read controlling unit which compares the output time limit values and sizes that are stored in the attribute storing memory for the first and second input packets and then selects one of the first and second input packets to output so that the first and second input packets will be output in decreasing order of size within the range in which a scheduled output time of each of said first and second input packets will meet the corresponding delay time limit values.

16. The packet multiplexer as set forth in claim 15, wherein
said input processing unit further comprising
an attribute table which stores said delay time limit values,
a time stamp generating unit which calculates said output time limit values based on said delay time limit values and a time required for each of said first and second input packets to arrive, and
a size measuring unit which measures the size of said first and second input packets and converts the result into values in terms of processing time corresponding to said size.

17. The packet multiplexer as set forth in claim 15, wherein
said read controlling unit selects an input packet by giving priority to input packets that will time out.

18. The packet multiplexer as set forth in claim 15, wherein
said input processing unit further comprising
an attribute table which stores said delay time limit values,
a time stamp generating unit which calculates said output time limit values based on said delay time limit values and a time required for each of said first and second input packets to arrive, and
a size measuring unit which measures the size of said first and second input packets and converts the result into values in terms of processing time corresponding to said size, wherein
said read controlling unit selects an input packet by giving priority to input packets that will time out.

19. The packet multiplexer as set forth in claim 15, wherein
said input processing unit has an integration table for adding up said packet sizes to obtain an integrated value, wherein
said read controlling unit discards the contents stored in said storing memory, queue, and attribute storing memory if the integrated value in said integration table exceeds a predetermined threshold.

20. The packet multiplexer as set forth in claim 15, wherein
said input processing unit further comprising
an attribute table which stores said delay time limit values,
a time stamp generating unit which calculates said output time limit values based on said delay time limit values and a time required for each of said first and second input packets to arrive,
a size measuring unit which measures the size of said first and second input packets and converts the result into values in terms of processing time corresponding to said size,
an integration table which adds up said packet sizes to obtain an integrated value, wherein
said read controlling unit discards the contents stored in said storing memory, queue, and attribute storing memory if the integrated value in said integration table exceeds a predetermined threshold.

21. The packet multiplexer as set forth in claim 15, wherein
said input processing unit has an integration table for adding up said packet sizes to obtain an integrated value, wherein
said read controlling unit selects an input packet by giving priority to input packets that will time out,
and discards the contents stored in said storing memory, queue, and attribute storing memory if the integrated value in said integration table exceeds a predetermined threshold.

22. The packet multiplexer as set forth in claim 15, wherein
said input processing unit further comprising
an attribute table which stores said delay time limit values, a time stamp generating unit which calculates said output time limit values based on said delay time limit values and a time required for each of said first and second input packets to arrive, a size measuring unit which measures the size of said first and second input packets and converts the result into values in terms of processing time corresponding to said size, and an integration table which adds up said packet sizes to obtain an integrated value, wherein said read controlling unit selects an input packet by giving priority to input packets that will time out, and discards the contents stored in said storing memory, queue, and attribute storing memory if the integrated value in said integration table exceeds a predetermined threshold.

23. The packet multiplexer as set forth in claim 15, wherein said input processing unit has an integration table for adding up said packet sizes to obtain an integrated value, wherein said read controlling unit sets the output time limit value for an input packet stored in said attribute storing memory to a predetermined maximum value if the integrated value in the integration table exceeds a predetermined threshold.

24. The packet multiplexer as set forth in claim 15, wherein said input processing unit further comprising an attribute table which stores said delay time limit values, a time stamp generating unit which calculates said output time limit values based on said delay time limit values and a time required for said first and second input packets to arrive, a size measuring unit which measures the size of said first and second input packets and converts the result into values in terms of processing time corresponding to said size, and an integration table which adds up said packet sizes to obtain an integrated value, wherein said read controlling unit sets the output time limit value for an input packet stored in said attribute storing memory to a predetermined maximum if the integrated value in the integration table exceeds a predetermined threshold.

25. The packet multiplexer as set forth in claim 15, wherein said input processing unit has an integration table for adding up said packet sizes, wherein said read controlling unit selects an input packet by giving priority to input packets that will time out, and sets the output time limit value for an input packet stored in said attribute storing memory to a predetermined maximum value if the integrated value in the integration table exceeds a predetermined threshold.

26. The packet multiplexer as set forth in claim 15, wherein said input processing unit further comprising an attribute table which stores said delay time limit values, a time stamp generating unit which calculates said output time limit values based on said delay time limit values and a time required for each of said first and second input packets to arrive, a size measuring unit which measures the size of said first and second input packets and converts the result into values in terms of processing time corresponding to said size, and an integration table which adds up said packet sizes to obtain an integrated value, wherein said read controlling unit selects an input packet by giving priority to an input packet that will time out, and sets the output time limit value for an input packet in said attribute storing memory to a predetermined maximum if the integrated value in the integration table exceeds a predetermined threshold.

27. The packet multiplexer as set forth in claim 15, wherein said storing memory comprises:

a high-priority queue which stores the output order of delay-guaranteed packets to be output earlier, and a low-priority queue which stores the output order of non-delay-guaranteed packet, wherein said read controlling unit whenever one or more input packets exist in said high-priority queue, gives output priority to said one or more input packets.

28. The packet multiplexer as set forth in claim 15, wherein said first storing unit comprises:

a high-priority queue which stores the output order of delay-guaranteed packets to be output earlier, and a low-priority queue which stores the output order of non-delay-guaranteed packets, wherein said read controlling unit selects from one or more packets stored in said high-priority queue by giving priority to input packets that will time out, and selects from one or more input packets stored in said low-priority queue in sequence from the output order of non-delay-guaranteed packets.

29. A method of packet scheduling, comprising:

receiving two or more packets, each packet having a corresponding delay time limit value and a size;

calculating an output time limit value for each of the packets based on the delay time limit value corresponding to each packet;

determining a processing time for each of the packets, the processing time being based on the size of the packet;

comparing the output time limit values and processing times for two of the packets;

selecting one of the two packets for outputting so the two packets are scheduled for outputting in decreasing order of size within the output time limit values of the two packets.

* * * * *